US010952212B2

(12) United States Patent
Axmon et al.

(10) Patent No.: US 10,952,212 B2
(45) Date of Patent: Mar. 16, 2021

(54) COMMUNICATION DEVICE AND METHOD FOR ADAPTING RADIO FREQUENCY RECEIVING BANDWIDTH

(71) Applicant: Telefonaktiebolaget LM Ericsson (publ), Stockholm (SE)

(72) Inventors: Joakim Axmon, Kavlinge (SE); Bengt Lindoff, Bjarred (SE); Reza Moosavi, Linkoping (SE); Edgar Ramos, Kirkkonummi (FI); Claes Tidestav, Balsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 94 days.

(21) Appl. No.: 15/567,587

(22) PCT Filed: Jan. 30, 2017

(86) PCT No.: PCT/EP2017/051886
§ 371 (c)(1),
(2) Date: Oct. 18, 2017

(87) PCT Pub. No.: WO2018/137779
PCT Pub. Date: Aug. 2, 2018

(65) Prior Publication Data
US 2018/0295620 A1  Oct. 11, 2018

(51) Int. Cl.
*H04W 72/04*  (2009.01)
*H04L 5/00*  (2006.01)
*H04B 7/024*  (2017.01)

(52) U.S. Cl.
CPC ........ *H04W 72/0453* (2013.01); *H04B 7/024* (2013.01); *H04L 5/001* (2013.01);
(Continued)

(58) Field of Classification Search
CPC .. H04W 72/044; H04W 2/042; H04L 5/0048; H04L 5/0053; H04L 5/0007; H04L 5/14; Y02D 70/01
See application file for complete search history.

(56) References Cited

U.S. PATENT DOCUMENTS

| | | | |
|---|---|---|---|
| 2012/0033571 A1* | 2/2012 | Shimezawa | H04B 7/026 370/252 |
| 2012/0076127 A1* | 3/2012 | Mourad | H04L 1/0079 370/345 |

(Continued)

FOREIGN PATENT DOCUMENTS

WO  WO 2018/085145  * 11/2018

OTHER PUBLICATIONS

Author Unknown, UE-specific RF Bandwidth Adaptation for Single Component Carrier Operation, Jan. 19, 2017, pp. 1-6 (Year: 2017).*

(Continued)

*Primary Examiner* — Christopher M Crutchfield
(74) *Attorney, Agent, or Firm* — Patent Portfolio Builders, PLLC (57) ABSTRACT

A wireless communication device and method therein for adapting radio frequency receiving bandwidth are disclosed. The wireless communication device is configured to obtain information on respective bandwidths and center frequencies of a first and a second channels. The wireless communication device is further configured to determine a total receiving bandwidth to use at a time instant based on the respective bandwidths and time instants for reception of the first and second channels and adapt the radio frequency receiving bandwidth in the wireless communication device based on the determined total receiving bandwidth.

16 Claims, 4 Drawing Sheets

(52) U.S. Cl.
CPC .......... *H04L 5/0035* (2013.01); *H04L 5/0048* (2013.01); *H04L 5/0053* (2013.01); *H04L 5/0064* (2013.01); *H04L 5/0098* (2013.01); *H04W 72/042* (2013.01)

(56) References Cited

U.S. PATENT DOCUMENTS

| | | | |
|---|---|---|---|
| 2013/0039349 A1* | 2/2013 | Ebrahimi Tazeh Mahalleh .......... | H04L 1/0013 370/336 |
| 2017/0289907 A1* | 10/2017 | Ang .................. | H04W 52/0216 |
| 2018/0091212 A1* | 3/2018 | Lee ...................... | H04B 7/0695 |
| 2018/0091994 A1* | 3/2018 | Ozturk .................. | H04W 24/10 |

OTHER PUBLICATIONS

Author Unknown, Discussion on UE RF Bandwidth Adaptation in NR, Jan. 19, 2017, pp. 1-3 (Year: 2017).*
Author Unknown, Discussion on bandwidth adaptation in NR, Jan. 19, 2017, pp. 1-3 (Year: 2017).*
Author Unknown, Bandwidth adaptation for NR, Jan. 19, 2017, pp. 1-3 (Year: 2017).*
Author Unknown, Mechanisms of bandwidth adaptation, 3GPP TSG RAN WG1 NR Ad Hoc Meeting, Doc. No. R1-1700011, Jan. 20, 2017, pp. 1-5 (Year: 2017).*
Author Unknown, Wide Bandwidth Operational Aspects, 3GPP TSG-RAN WG1 Meeting #87, Doc. No. R1-1612436, pp. 1-4, Nov. 18, 2016 (Year: 2016).*
Author Unknown, Further discussion on bandwidth adaptation, 3GPP TSG RAN WG1 Meeting NR-AH1, Doc. No. R1-1700497, pp. 1-5, Jan. 20, 2017 (Year: 2017).*
Author Unknown, Bandwidth adaptation in NR, 3GPP TSG RAN WG1 NR Ad-Hoc Meeting, Doc. No. R1-1700709, pp. 1-5, Jan. 20, 2017 (Year: 2017).*
PCT International Search Report, dated Oct. 4, 2017, in connection with International Application No. PCT/EP20171051886, all pages.
PCT Written Opinion, dated Oct. 4, 2017, in connection with International Application No. PCT/EP2017/051886, all pages.
3GPP TSG-RAN WG1 NR AH Meeting, R1-1700158, Spokane, Washington, USA, Jan. 16-20, 2017, MediaTek Inc., UE-specific RF Bandwidth Adaptation for Single Component Carrier Operation, 6 pages.
3GPP TSG RAN WG1 NR Ad Hoc Meeting, R1-1700011, Spokane, Washington, USA, Jan. 16-20, 2017, Huawei, HiSilicon, Mechanisms of bandwidth adaptation, 5 pages.
3GPP TSG RAN WG1 Meeting NR-AH1, R1-1700497, Spokane, Washington, USA, Jan. 16-20, 2017, LG Electronics, Further discussion on bandwidth adaptation, 5 pages.
3GPP TSG-RAN WG4 Meeting #81-NR-AH, R4-170032, Spokane, Washington, USA, Jan. 17-19, 2017, Ericsson, Bandwidth adaptation for NR, 7 pages.
European Office Action issued in corresponding EP Application No. 17702356.1 dated Sep. 1, 2020, 6 Pages.

* cited by examiner

COMMUNICATION DEVICE AND METHOD FOR ADAPTING RADIO FREQUENCY RECEIVING BANDWIDTH

TECHNICAL FIELD

Embodiments herein relate to a wireless communication device and method therein. In particular, they relate to adapting radio frequency receiving bandwidth in a wireless communication device.

BACKGROUND

Wireless communication networks, such as Global System for Mobile Communications (GSM) networks, Wideband Code Division Multiple Access (WCDMA) or High Speed Packet Access (HSPA) networks, 3G Long Term Evolution (LTE) networks, Worldwide interoperability for Microwave Access (Wimax) network, Wireless Local Area Network (WLANN/Wi-Fi), LTE advanced or Fourth Generation (4G) networks, usually cover a geographical area which is divided into cell areas. Each cell area is served by a base station, which may also be referred as a Network (NW) node, an eNodeB (eNB), a gNodeB, an access node, etc. A wireless communication network may include a number of cells that can support communications for a number of wireless communication devices or User Equipment (UE). Each cell or NW node may use certain carrier frequencies and cover certain system bandwidth. The NW node serves a wireless communication device via a communication link, which may be referred to as a serving node, cell, beam, sector, etc.

The current cellular LTE standard supports flexible Bandwidth (BW), e.g., from 1.4 MHz up to 20 MHz, and even wider bandwidths using carrier aggregation techniques. In order for a wireless communication device, e.g., a UE, to connect to a NW node, the wireless communication device must determine the cell carrier frequency as well as the system bandwidth to use. Furthermore, in current LTE standards, there is a requirement that the NW node and the wireless communication device support and connect using the same system BW. Hence, the wireless communication device must search for relevant control messages over the entire system BW of the NW node.

For the upcoming New Radio-access technology in 5G, denoted NR herein, a more generic approach is desirable with respect to the system bandwidths of respective network nodes. NR should support multiple types of wireless communication devices. A range of device types includes, for example, from high-end Mobile Broadband (MBB) devices capable of supporting system BWs up to several GHz, down to low-cost, low-power Machine Type Communication (MTC) devices, which may support BWs of 100 KHz or perhaps a few MHz. Hence a desired requirement is that a device, e.g. a UE, which may support, e.g. 100 MHz bandwidth, may be allocated a dedicated UE system BW, referred to as a scheduling BW, e.g. maximum 100 MHz anywhere within the total system BW of a NW node gNodeB, e.g. 1000 MHz. It is also desirable that the NW node can allocate a smaller scheduling BW than the one supported by a UE.

In NR the system BW may be very large, and in order for a UE to be energy efficient, the UE should not be mandated to receive the entire system BW if not needed. Hence in NR it is proposed that the UE monitors for downlink control information, i.e. control channels etc. in one or more "control sub band". The control sub band is configured by the serving cell or serving beam. Then the UE may reduce the radio receiver BW to cover only the control sub band to save power in its radio receiver.

In NR it is proposed that the UE relies on mobility pilots or synchronization (sync) signals for mobility measurements. The mobility pilots or sync signals will not fill up the entire system BW of a NW node e.g. gNodeB, but instead only a sub band i.e. a part of the system BW. The sub band will be configured by the serving NW node or serving beam, which informs adjacent NW nodes which sub band to use and the UE is also informed about the sub band in order to know where to find the mobility pilots/sync signals. The mobility pilots or sync signals may be transmitted on another sub band than the control sub band, which is inefficient for the UE radio receiver power when the UE needs to do Radio Resource Management (RRM) measurements.

SUMMARY

It is therefore an object of embodiments herein to provide an improved method and apparatus for optimizing power efficiency in a wireless communication device.

According to a first aspect of embodiments herein, the object is achieved by a method for adapting radio frequency receiving bandwidth in a wireless communication device. The wireless communication device obtains information on respective bandwidths and centre frequencies of a first channel and a second channel. The wireless communication device further determines a total receiving bandwidth to use at a time instant based on the respective bandwidths and time instants for reception of the first and second channels. The wireless communication device then adapts the radio frequency receiving bandwidth based on the determined total receiving bandwidth.

According to a second aspect of embodiments herein, the object is achieved by a wireless communication device for adapting its radio frequency receiving bandwidth. The wireless communication device is configured to obtain information on respective bandwidths and centre frequencies of a first channel and a second channel. The wireless communication device is further configured to determine a total receiving bandwidth to use at a time instant based on the respective bandwidths and time instants for reception of the first and second channels. The wireless communication device is further configured to adapt the radio frequency receiving bandwidth based on the determined total receiving bandwidth.

According to embodiments herein, the first and second channels may be any one of a control channel, a data channel, or a channel transmitting mobility pilots, e.g., dedicated pilots, common pilots, or synchronization signals. Therefore, the radio receiver BW is adapted based on information about the control sub band transmitted on control channels, data sub band transmitted on data channels, mobility pilot sub bands and time instants for reception of these sub bands, for example, when the wireless communication device needs to monitor the control channel, when the wireless communication device is configured to measure or doing cell search or cell detection or cell identification on mobility pilots or sync signals.

The embodiments herein enable the wireless communication device to reduce power consumption by only using sufficient receiver BW for reception of data and/or layer 1 or 2 control channel as well as information about mobility pilots/sync signals used for Radio Resource Management (RRM) measurements. For example, the wireless communication device only needs to receive over a wider or larger receiving bandwidth when necessary and hence can most of the time only use a narrower or smaller receiving bandwidth and thereby saves significantly in radio receiver energy consumption.

Therefore, the embodiments herein provide an improved method and apparatus for optimizing power efficiency by adapting radio frequency receiving bandwidth in a wireless communication device.

BRIEF DESCRIPTION OF THE DRAWINGS

Examples of embodiments herein are described in more detail with reference to attached drawings in which.

DETAILED DESCRIPTION

Figure 1:
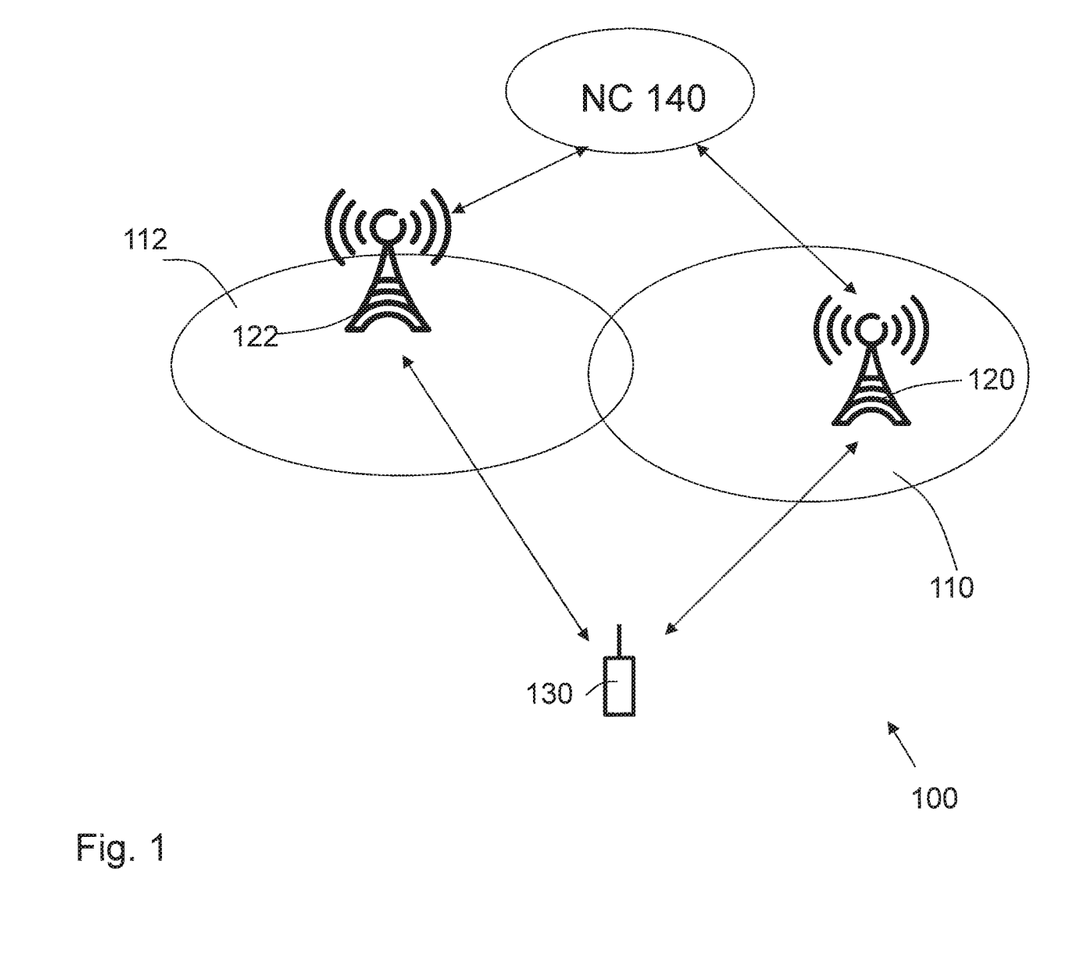
FIG. 1 is a schematic block diagram illustrating embodiments of a wireless communication network in which embodiments herein may be implemented.

FIG. 1 depicts an example of a wireless communication network 100 in which embodiments herein may be implemented. The wireless communication network 100 may be any wireless system or cellular network, such as a Long Term Evolution (LTE) network, any $3^{rd}$ Generation Partnership Project (3GPP) cellular network, Worldwide interoperability for Microwave Access (Wimax) network, Wireless Local Area Network (WLAN/Wi-Fi), an LTE advanced or Fourth Generation (4G) network, a Fifth Generation (5G) or New Radio (NR) network etc.

The wireless communication network 100 comprises a plurality of cells whereof two, a first cell 110 comprising a first network node 120 and a second cell 112 comprising a second network node 122, are depicted in FIG. 1. The first network node 120 serves the first cell 110, while the second network node 122 serves the second cell 112. The first network node 120 and the second network node 122 are network access nodes which each may be, for example, an eNB, gNB, eNodeB, gNodeB, or an Home NodeB, or an Home eNodeB or an Home gNodeB. For the sake of easier understanding by the reader, the term "cell" has been used above. However, spatial division between operation areas of a network node may be based on other entities, such as sectors, beams, etc.. Sectors are statically defined directions from an antenna of the network node and beams are dynamically defined directions from an antenna of the network node. Thus, for any disclosure herein where the term "cell" is used, the demonstrated principles are equally feasible for sectors, beams, etc., unless explicitly or implicitly expressed otherwise.

The wireless communication network may further comprise a network controller 140 which communicates with the first and second network nodes 120, 122, and acts as a handling unit or a controller for different Radio Access Technologies. The network controller 140 may be a separate node as depicted in the figure, or its corresponding functionalities may be incorporated within another network node, e.g. the network nodes 120, 122.

A plurality wireless communication devices operates in the wireless communication network 100, whereof a wireless communication device 130 is depicted in FIG. 1. The wireless communication device 130 may be any type of device with wireless communication capabilities, such as a UE, modem, an Internet of Things (IoT) device, an MTC device, a mobile wireless terminal or a mobile phone, a smartphone, or any other radio network unit capable to communicate over a radio link in a wireless communication network. As shown in FIG. 1, the wireless communication device 130 may communicate with or monitor signals from the first and second network nodes 120, 122.

Figure 2:
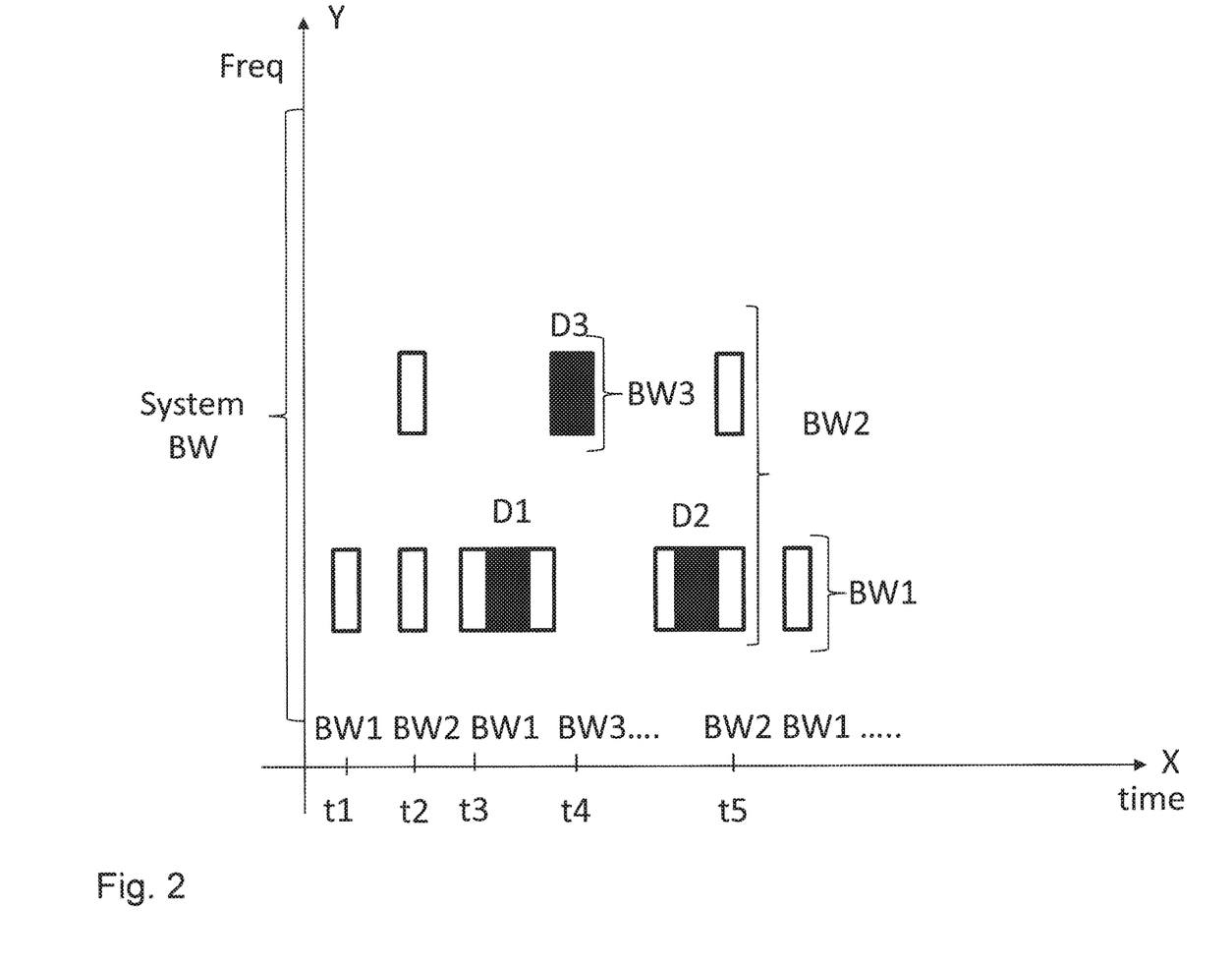
FIG. 2 is a schematic block diagram showing basic principles of a wireless communication device supporting reception of multiple receiver bandwidths (BWs).

FIG. 2 shows the basic principle of the embodiments herein for adapting radio frequency receiving bandwidth in the wireless communication device 130. The wireless communication device 130 supports different radio frequency receiving bandwidth, e.g., a first and at least a second receiver bandwidth BW1, BW2, at different time instances t1, t2, . . . t3 over a time period, as shown by X-axis, The system BW of a network node 120, e.g., a gNodeB, is shown on Y-axis. The wireless communication device 130 is configured to monitor a first sub band BW1 within the system BW of the gNodeB, where the wireless communication device 130 monitors a control channel, e.g., Physical Downlink Control Channel (PDCCH) at regular time instants, for instance, every Transmission Time Interval (TTI), e.g. every 1 ms. In some TTIs, data is scheduled to the wireless communication device 130, as shown by black boxes D1, D2. The black boxes D1, D2 show that the data may be scheduled for the wireless communication device 130 within the first receiver bandwidth BW1. However, in some TTIs, data may be scheduled to the wireless communication device 130 over a third receiver bandwidth BW3 outside the first receiver bandwidth BW1, as shown by black box D3. Furthermore, the wireless communication device 130 may also be configured by the serving cell or serving beam, e.g., the network node 120, to monitor mobility pilots and/or synchronization signals for mobility purposes in a second sub band BW2, i.e., monitor mobility pilots or sync signals from intra-frequency adjacent neighboring cells/beams, e.g., the network node 122, as well as from the serving cell/beams, e.g., the network node 120. The wireless communication device 130 knows, either by explicit signaling from the network node of the serving cell/serving beam or from cell/beam detection, the timing of mobility pilots. In typical embodiments, the periodicity may be 5, 40, or 100 ms. A radio control unit in the wireless communication device 130 may receive information about sub bands, e.g., two sub bands of the control channel and mobility pilots, and determine a first center frequency and a second center frequency and receiver BWs that are needed for reception of the two sub bands when needed at certain time instants. For example, as shown in FIG. 2, at time t1, the wireless communication device 130 10 uses the first bandwidth BW1; at time t2, BW2; at time t4, BW3, etc.

Figure 3:
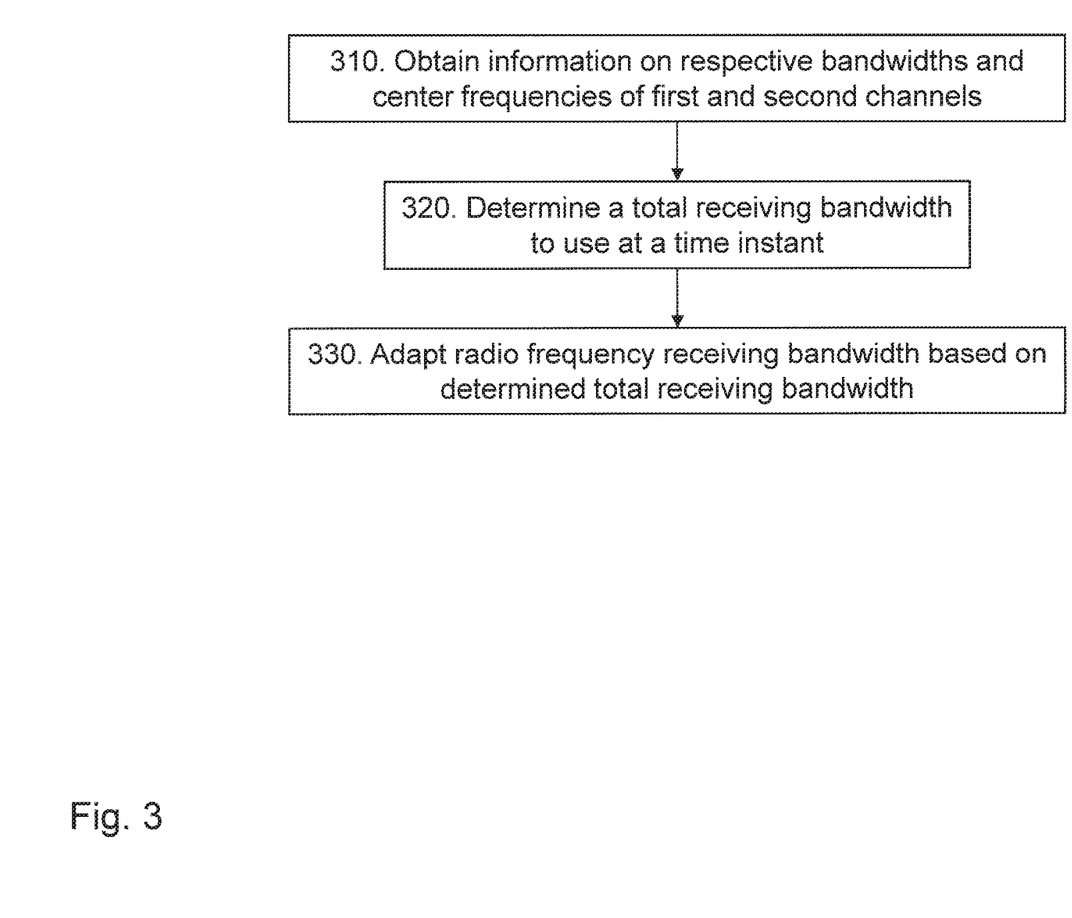
FIG. 3 is a flowchart depicting one embodiment of a method in a wireless communication device.

Example of embodiments of a method for adapting radio frequency receiving bandwidth performed by the wireless communication device 130 in the wireless communication network 100 will now be described with reference to FIG. 3. As described above, the wireless communication network 100 comprises a plurality of network nodes 120, 122, where the first network node 120 is the serving node which communicates with the wireless communication device 130 through a serving link. Though the network node 122 is depicted as a single node, it may represent any number of network nodes in the communication network 100, acting as non-serving network nodes/cells for the wireless communication device 130. In this respect, any non-serving network node may use the same carrier frequency as the serving network node 120, or different carrier frequencies. The serving node 120 may be referred to as any cell, beam, sector etc., which serves the wireless communication device 130 via a communication link.

According to the embodiments herein, the method comprises the following actions which actions may be performed in any suitable order:

Action 310

The wireless communication device 130 obtains information on respective bandwidths and center frequencies of a first and a second channel.

According to some embodiments herein, the first channel may be a control channel.

According to some embodiments herein, the second channel may be a channel transmitting mobility pilots comprising one of dedicated pilots dedicated to the wireless communication device, common pilots, synchronization signals. The mobility pilots may be transmitted from a neighboring cell or beam, e.g. the network node 122.

According to some embodiments herein, the second channel may be a data channel or a second control channel.

For example, the wireless communication device 130 may receive the control channel sub band configuration from the serving cell/sewing beam, i.e., the number of resource blocks as well as center frequency, which may be expressed as relative system BW center frequency. The wireless communication device 130 may monitor at least one control channel, and further also which time instances to perform the monitoring, e.g., every TTI, every nth TTI, or Discontinuous Reception (DRX) cycles, etc. The wireless communication device 130 may also receive information about the second channel sub bands, i.e., the BW and center frequency, where the mobility pilots/sync signals are transmitted from the serving network node 120 and/or a neighbouring cell or beam, e.g., the network node 122, for mobility measurements, as well as timing for the mobility pilots, e.g., every 5, 40, 100 ms etc.

The information on respective bandwidths and center frequencies of the first and second channels as well as time instances for the first and second channel, i.e. the phase of which TTI and Orthogonal Frequency Division Multiplexing (OFDM) symbol(s) within a time period, e.g. 100 ms, may be configured by the serving cell/beam, or may be determined by the wireless communication device 130 itself during cell detection phase.

Therefore according to some embodiments herein, the wireless communication device 130 may obtain information on respective bandwidths and center frequencies of the first and second channels by receiving a configuration message from a serving cell or beam.

Action 320

The wireless communication device 130 determines a total receiving bandwidth to use at a time instant based on the respective bandwidths and time instants for reception of the first and second channels.

For example, a radio receiver control unit comprised in the wireless communication 30 device 130 may use the information of the respective bandwidths and time instants for reception of the first and second channels to configure at least two receiver BWs and center frequencies. One for only control channel monitoring, and one for joint control channel monitoring and mobility pilot measurements.

According to some embodiments herein, at a first time instant when the reception of the second channel is not needed, the total receiving bandwidth is determined to be the bandwidth of the first channel. For example, at time instances t1, t3 shown in FIG. 2, the total receiving bandwidth is BW1.

According to some embodiments herein, at a second time instant when both the reception of the first and second channel are needed, the total receiving bandwidth may be determined to cover both bandwidths of the first and second channels. For example, at time instances t2, t5 shown in FIG. 2, the total receiving bandwidth is BW2.

According to some embodiments herein, at a third time instant when the reception of the second channel is needed but not the reception of the first channel, the total receiving bandwidth is determined to be the bandwidth of the second channel. For example, at time instance t4 shown in FIG. 2, the total receiving bandwidth is BW3.

According to some embodiments herein, the total receiving bandwidth to use at one or more of the time instants may be smaller than a system bandwidth of the serving cell or beam. For example, at time instances t1, t2, t3, t4, t5 shown in FIG. 2, the total receiving bandwidth BW1, BW2, BW3 are smaller than a system bandwidth BW of the serving cell or beam.

Although in these example embodiments, the first receiver bandwidth BW1 may be smaller than the gNodeB 120 system BW, and the second receiver bandwidth BW2 may be smaller than the gNodeB 120 system BW, in some embodiments, the second receiver bandwidth BW2 may be the same as the gNodeB 120 system BW.

Action 330

The wireless communication device 130 adapts the radio frequency receiving bandwidth based on the determined total receiving bandwidth.

For example, the wireless communication device 130 may adapt receiving bandwidth to a smaller first receiver bandwidth BW1 to only cover the control signal sub band. The control channel monitoring is usually made more often compared to the mobility measurements, so by only receiving the control signal sub band with a smaller receiver bandwidth, power consumption in the receiver is reduced.

When the control unit determines a need for mobility measurements, the wireless communication device 130 may adapt receiving bandwidth or reconfigure the radio receiving bandwidth to a wider or larger second receiver bandwidth BW2 covering both the control channels and mobility pilots/sync signals.

The control channel is monitored and mobility measurements are performed respectively by using well-known principles in the art. For example, one or more of Reference Signal Received Power (RSRP), Reference Signal Received Quality (RSRQ), received signal strength indicator (RSSI), Signal to Noise Ratio (SNR) and Signal to Interference plus Noise Ratio (SINR) etc. are measured.

According to some embodiments, the mobility measurements are made at a time instant where the wireless communication device 130 do not need to monitor the control channel, and then the radio control unit may adapt the radio receiving bandwidth to cover only the mobility pilot/sync signal sub band.

Once the mobility measurement is made, the control unit may reconfigure the receiving bandwidth to a smaller bandwidth BW1 covering only the control channel sub band.

Alternatively, the control unit may reconfigure the receiving bandwidth to a smaller bandwidth BW3 covering only the data channel.

Figure 4:
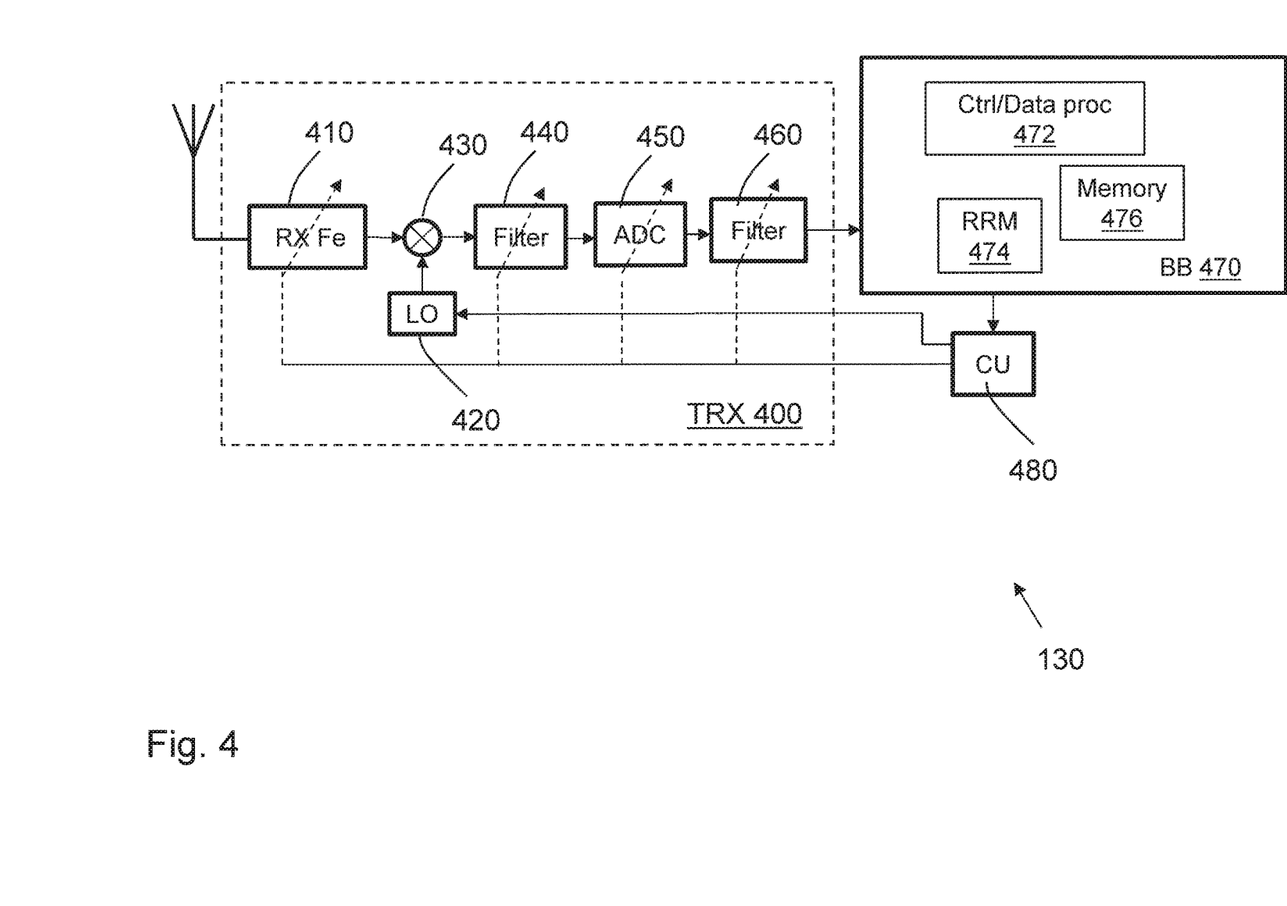
FIG. 4 is a schematic block diagram illustrating an example embodiment of a wireless communication device.

To perform the method actions in the wireless communication device 130 for adapting radio frequency receiving bandwidth in the wireless communication network 100 described above in relation to FIG. 3, the wireless communication device 130 comprises circuits or units as depicted in FIG. 4. The wireless communication device 130 comprises a radio receiver/transceiver unit TRX 400 which comprises, e.g., receiver front end (RX Fe) units 410 that are mainly used for receiving a radio frequency (RF) signal and filtering out frequency band used for reception and amplifying the filtered RF signal by a Low Nosie Amplifier (LNA), local oscillator (LO) 420 generation and mixer stages 430, for down converting the RF signal to a baseband signal. The radio receiver/transceiver unit 400 further comprises analog filters 440, Analog-to-Digital converters (ADCs) 450, and digital filters 460. The wireless communication device 130 may furthermore include a Base Band (BB) processing unit 470 comprising at least a control channel and a data channel decoding unit 472 and a RRM unit 474 used for cell search/cell detection and RRM mobility measurements. Furthermore, the wireless communication device 130 comprises a control unit (CU) 480 that may be included in the BB processing unit 470 or in the radio receiver/transceiver unit 400. As described above, the control unit 480 determines or extracts the needed receiver BW, for e.g., control and data channel monitoring as well as for mobility pilot/sync signal monitoring, based on information about respective sub bands and timings of control/data channels as well as timing for mobility pilots/sync signals. The wireless communication device 130 may further comprise a memory 476.

According to the embodiments herein, the wireless communication device 130 is configured to, e.g. by means of the control unit 480 being configured to, obtain information on respective bandwidths and center frequencies of a first channel and second channel.

The wireless communication device 130 is further configured to, e.g. by means of the control unit 480 being configured to, determine a total receiving bandwidth to use at a time instant based on the respective bandwidths and time instants for reception of the first and second channels.

The wireless communication device 130 is further configured to, e.g. by means of the control unit 480 being configured to, adapt the radio frequency receiving bandwidth in the wireless communication device based on the determined total receiving bandwidth.

According to some embodiments herein, the first channel may be a control channel.

According to some embodiments herein, the second channel may be a channel transmitting mobility pilots comprising one of dedicated pilots dedicated to the wireless communication device, common pilots, synchronization signals. The mobility pilots may be transmitted from a neighbouring cell or beam.

According to some embodiments herein, the second channel may be a data channel or a second control channel.

According to some embodiments herein, the wireless communication device 130 may be configured to obtain information on respective bandwidths and center frequencies of the first and second channels by being configured to receive a configuration message from a serving cell or beam.

According to some embodiments herein, at a first time instant when the reception of the second channel is not needed, the total receiving bandwidth is determined to be the bandwidth of the first channel.

According to some embodiments herein, at a second time instant when both the reception of the first and second channel are needed, the total receiving bandwidth is determined to cover both bandwidths of the first and second channels.

According to some embodiments herein, at a third time instant when the reception of the second channel is needed but not the reception of the first channel, the total receiving bandwidth is determined to be the bandwidth of the second channel.

According to some embodiments herein, the total receiving bandwidth to use at one or more of the time instants is smaller or narrower than a system bandwidth of the serving cell or beam.

According to some embodiments herein, the control unit 480 may configure any one of or a combination of low noise amplifiers (LNA) in the receiver front end (RX Fe) units 410, mixers 430, analog and/or digital filters 440, 460, analog to digital converters 450, local oscillators 420, etc. in the wireless communication device 130. That is based on the needed first or at least second receiver BW, different radio parts, filters or ADCs are adapted for optimized low power operation.

For instance, if the first receiver bandwidth BW1 is used, and the first receiver bandwidth BW1 is in the central parts of the serving NW node system BW, signals adjacent in frequency will for example be those of the serving network node, e.g. scheduled to other wireless communication devices in the same cell or area, and may have similar spectral density as the signal to be received by the wireless communication device 130. Potential blocking or interfering signals outside the serving NW node system BW will thus be more distant relative to the first receiver BW1. This means that analog and digital selectivity filter 440, 460 may not need to have as steep roll-off as for the second receiver bandwidth BW2. Because in the second receiver bandwidth BW2 case, adjacent interferers may be an order of magnitude larger since they are transmitted from another uncoordinated NW node. Less steep roll-off translates to less complex filters, e.g. lower order and lower Q values of filter poles and this in turn may be used to lower power consumption of the filters. Furthermore, the dynamic range in the ADC 450 may be reduced as well and/or it may be operated at a lower sampling rate to further reduce the receiver power consumption of the wireless communication device 130. Alternatively, or in addition to the above the LO generation may also be reconfigured as higher phase noise levels may be accepted at a given offset from the center frequency of the first receiver bandwidth BW1 when blocking or interfering signals are more distant in frequency.

As another example of how the wireless communication device 130 may adapt the radio frequency receiving bandwidth, consider a case where the first receiver bandwidth BW1 is much smaller than the serving NW node system BW, e.g. a tenth or less, it may be justified also to jointly reconfigure the LNA and the mixer 430. While a possible wider second receiver bandwidth BW2 may be processed with a conventional wideband LNA/mixer topology, the first receiver bandwidth BW1 may be processed with a frequency-translation LNA/mixer topology, also known as N-path filter. The latter may not be used for the second receiver bandwidth BW2 due to the stringent selectivity requirements but may be sufficient or at least constitute a substantial contribution to the overall selectivity prior to the ADC. Correspondingly, different types of ADCs may be used for the first and second receiver bandwidth BW1, BW2. For example, the second receiver bandwidth BW2 may require a Nyquist ADC while the first receiver bandwidth BW1 may allow a filtering oversampled ADC, e.g. filtering Delta-Sigma modulator ADC. In the latter case the filtering of the ADC may suffice for the analog baseband selectivity such that no separate baseband analog filter is required.

For another example, when configuring the analog and/or digital filters 440, 460, it may cover both adapting filter functions, as well as switching in other filter functions depending on the first and at least the second receiver bandwidth BW1, BW2, BW3. It may also cover changing of only a subset of the analog/digital filters as well as the ADC. The control unit 480 may also be in control of adapting the LO 420 for the different receiver BWs if needed.

Those skilled in the art will appreciate that the receiver front end units RX Fe 410, the local oscillator LO 420 generation and mixer stages 430, analog filters 440, Analog-to-Digital converters (ADCs) 450, digital filters 460, Base Band (BB) processing unit 470 described above in the wireless communication device 130 may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for adapting radio frequency receiving bandwidth of the wireless communication device 130 in the wireless communication network 100 may be implemented through one or more processors, such as the BB processing unit 470, together with computer program code for performing the functions and actions of the embodiments herein. The program code mentioned above may also be provided as a computer program product, for instance in the form of a data carrier carrying computer program code for performing the embodiments herein when being loaded into the wireless communication device 130. One such carrier may be in the form of a CD ROM disc. It is however feasible with other data carriers such as a memory stick. The computer program code may furthermore be provided as pure program code on a server and downloaded to the wireless communication device 130.

The memory 476 in the wireless communication device 130 may comprise one or more memory units either comprised in the BB processing unit 470 or separated, and may be arranged to be used to store received information, measurements, data, configurations and applications to perform the methods herein when being executed in the wireless communication device 130.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method for adapting radio frequency receiving bandwidth in a wireless communication device, the method comprising:

obtaining, by the wireless communication device, information on respective bandwidths and center frequencies of a first channel and a second channel, wherein the first channel is a control channel and the second channel is a joint channel for control channel monitoring and mobility pilot measurements;

determining, by the wireless communication device, a total receiving bandwidth to use at a time instant based on the obtained information on respective bandwidths and time instants for reception of the first and second channels, wherein, when the respective time instants for reception of the first and second channels overlap, the total receiving bandwidth is determined to include the bandwidth for reception of the first channel and the bandwidth for reception of the second channel; and adapting, by the wireless communication device, the radio frequency receiving bandwidth in the wireless communication device based on the determined total receiving bandwidth, wherein adapting the radio frequency receiving bandwidth comprises:

determining a need for the mobility pilot measurements;

adapting the radio frequency receiving bandwidth to a bandwidth including the bandwidth for reception of the first channel and the bandwidth for reception of the second channel, based on the determined need for the mobility pilot measurements; and reconfiguring the radio frequency receiving bandwidth to the bandwidth for reception of the first channel when the mobility pilot measurements are completed.

2. The method according to claim 1, wherein the mobility pilot measurements include measurements of mobility pilots comprising one of dedicated pilots dedicated to the wireless communication device, common pilots, and synchronization signals.

3. The method according to claim 2, wherein the mobility pilots are transmitted from a neighbouring cell or beam.

4. The method according to claim 1, wherein obtaining the information on respective bandwidths and center frequencies of the first and second channels comprises receiving a configuration message from a serving cell or beam.

5. The method according to claim 1, wherein at a first time instant when the reception of the second channel is not needed, the total receiving bandwidth is determined to be the bandwidth of the first channel.

6. The method according to claim 1, wherein at a third time instant when the reception of the second channel is needed and the reception of the first channel is not needed, the total receiving bandwidth is determined to be the bandwidth of the second channel.

7. The method according to claim 1, wherein the total receiving bandwidth to use at one or more of the time instants is smaller than a system bandwidth of a serving cell or beam.

8. The method according to claim 1, wherein adapting the radio frequency receiving bandwidth in the wireless communication device further comprises configuring one of or a combination of low noise amplifiers, mixers, analog and/or digital filters, analog to digital converters, and local oscillators.

9. A wireless communication device for adapting radio frequency receiving bandwidth, wherein the wireless communication device is configured to:

obtain information on respective bandwidths and center frequencies of a first channel and a second channel, wherein the first channel is a control channel and the second channel is a joint channel for control channel monitoring and mobility pilot measurements;

determine a total receiving bandwidth to use at a time instant based on the obtained information on respective bandwidths and time instants for reception of the first and second channels, wherein, when the respective time instants for reception of the first and second channels overlap, the total receiving bandwidth is determined to include the bandwidth for reception of the first channel and the bandwidth for reception of the second channel; and adapt the radio frequency receiving bandwidth in the wireless communication device based on the determined total receiving bandwidth, wherein to adapt the radio frequency receiving bandwidth, the wireless communication device is further configured to:

determine a need for the mobility pilot measurements;

adapt the radio frequency receiving bandwidth to a bandwidth including the bandwidth for reception of the first channel and the bandwidth for reception of the second channel, based on the determined need for the mobility pilot measurements; and reconfigure the radio frequency receiving bandwidth to the bandwidth for reception of the first channel when the mobility pilot measurements are completed.

10. The wireless communication device according to claim 9, wherein the mobility pilot measurements include measurements of mobility pilots comprising one of dedicated pilots dedicated to the wireless communication device, common pilots, and synchronization signals.

11. The wireless communication device according to claim 10, wherein the mobility pilots are transmitted from a neighbouring cell or beam.

12. The wireless communication device according to claim 9, wherein the wireless communication device is configured to obtain the information on respective bandwidths and center frequencies of the first and second channels by being configured to receive a configuration message from a serving cell or beam.

13. The wireless communication device according to claim 9, wherein at a first time instant when the reception of the second channel is not needed, the total receiving bandwidth is determined to be the bandwidth of the first channel.

14. The wireless communication device according to claim 9, wherein at a third time instant when the reception of the second channel is needed and the reception of the first channel is not needed, the total receiving bandwidth is determined to be the bandwidth of the second channel.

15. The wireless communication device according to claim 9, wherein the total receiving bandwidth to use at one or more of the time instants is smaller than a system bandwidth of a serving cell or beam.

16. The wireless communication device according to claim 9, wherein the wireless communication device is further configured to adapt the radio frequency receiving bandwidth by configuring one of or a combination of low noise amplifiers, mixers, analog and/or digital filters, analog to digital converters, and local oscillators.

* * * * *